United States Patent Office 3,687,774
Patented Aug. 29, 1972

3,687,774
METHOD OF RENDERING EXTREMELY FLEXIBLE A RELATIVELY RIGID AND BRITTLE SHEET, PANEL OR ELONGATED BODY OF CELLULAR PLASTIC MATERIAL HAVING COMPRESSIBLE FOAMED CELLS
Alfred Grubstad, Dronningensgate 48/50, Bodo, Norway
Filed Jan. 7, 1970, Ser. No. 1,142
Claims priority, application Norway, Jan. 16, 1969, 173/69
Int. Cl. C09j 5/00
U.S. Cl. 156—324                                    1 Claim

ABSTRACT OF THE DISCLOSURE

A method of rendering extremely flexible a relatively rigid and brittle sheet, panel or elongated body of cellular plastic material (polyurethane, polystyrene) having compressible foamed cells. At least one surface of the body is during or subsequent to manufacture thereof, in suitable manner provided with and adhered to a flexible, non-stretchable layer or film, to prevent rupture or crack-formation in the stretch area of the bent portion, which would have lead to consequent rupture of the body when said body is subjected to sharp bending.

---

Figure 1:
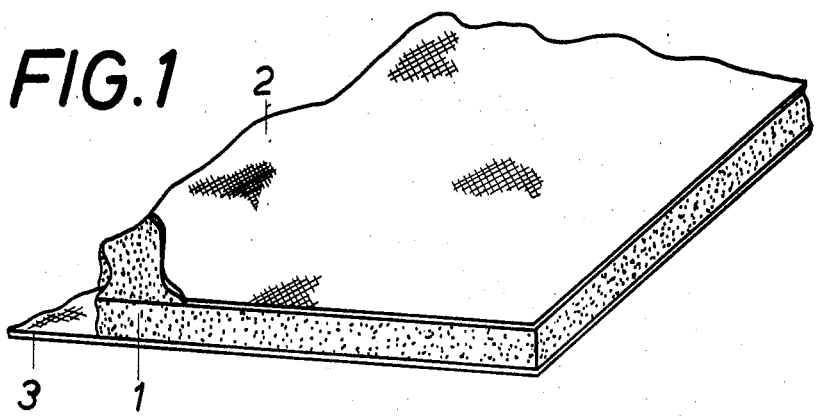

The present invention relates to a method of rendering extremely flexible a relatively rigid and brittle sheet, panel or elongated body of cellular plastic material having compressible, foamed, expanded cells so that bodies of such shape, and produced from cellular plastic material such as polystyrene, polyurethane, polyester, polyethylene, ect., may be utilized in ways and fields which the relatively rigid and brittle nature of the material has hitherto prevented.

When using such panels of the descrbied material for insulation purposes within the building industry, ship building industry and other fields, it has previously been necessary to use the panels in their plane shape since even when subjected to relatively slight bending stress they have shown a tendency to crack-formation and eventual rupture. When panelling a room or the outer or inner surface of a tank, therefore, it has been necessary to fit the plane panels to plane surfaces and, where the said plane surfaces are at an angle, to join the plane panels in a suitable manner e.g. by means of an adhesive or press fitting. It has not been possible to utilize this type of panel for curved surface by reason of the foresaid disadvantages, viz they are so brittle that they crack even when subjected to very slight bending stress.

In other fields where these relatively rigid and brittle cellular plastic materials have been used, for instance as thermal insulation insertions in car seat covers, it has proved that this panel material, when subjected to stress and in this connection bending stress, after a certain period of time becomes broken into small pieces which slip or are forced together in certain parts of the channels or cavities then partially collapse and the insulating properties are substantially reduced. This is the case wherever a relatively brittle cellular plastic material in sheet or panel form is loosely inserted in channels between two outer material layers such as textile or other thin material and subjected to bending stresses.

The object of the present invention is to eliminate the above said disadvantages when using relatively rigid and brittle cellular plastic material having compressible, foamed cells, by providing a method for rendering such material flexible, so flexible that even relatively thick panels e.g. from 2 to 5 cm. may be bent 180°, so that the surfaces are in facing relationship without rupture of the panel.

In accordance with the invention this is achieved by means of a known principle, viz to prevent expansion of the material in the stretch area of the bent portion and thus prevent rupture due to the brittle nature of the material. This principle is known to be used e.g. in connection with the production of veneer sheets where, by laminating a rigid core with flexible covering layers, a product with good bending properties is obtained.

Such lamination of relatively rigid and brittle cellular plastic material with a very bendable and non-stretchable outer layer or film of textile, gauze, plastic film etc., has not hitherto been known or used to render such materials flexible and thus widens the field of utilization.

The invention thus resides in a method of rendering extremely flexible a relatively rigid and brittle sheet, panel or elongated body of cellular plastic material having compressible foamed cells, and is characterized in that at least one surface of the body, during or subsequent to manufacture thereof, is in suitable manner provided with and adhered to a flexible, non-stretchable layer or film which is adapted to prevent rupture or crack-formation with consequent rupture of the body when said body is subjected to sharp bending.

Another feature of the invention is that the cellular plastic material used is polystyrene, polyurethane, polyester, polyethylene etc.

A further feature is that textile material, gauze, plastic film, glass fibre cloth etc., having sufficient mechanical strength for the purpose, is used as outer layer or film.

An even further feature is that the outer layer or film is provided by coating the said surface with liquid plastic which adheres thereto and hardens to a film.

In the method according to the invention, a laminate is produced consisting of the said relatively rigid and brittle cellular plastic material coated with a film or layer of suitable material on at least one side surface thereof, the said film or layer being firmly adhered to the cell bodies over the said surface, e.g. by means of adhesive, vulcanization or other suitable means so that on bending of the laminate, the outer strong and flexible material layer prevents the formation of cracks or splits in the cellular plastic material thereby preventing rupture thereof.

Figure 2:
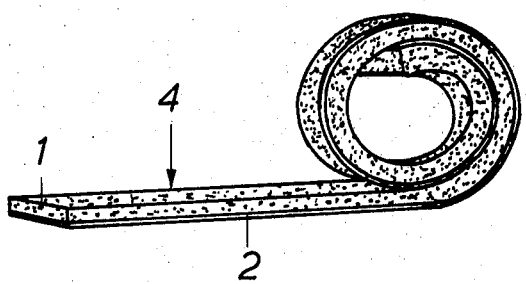
Figure 3:
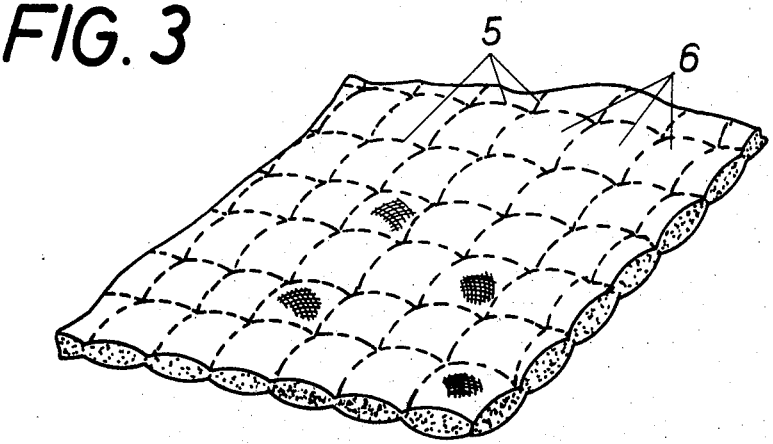

The invention is further described in the following with indication of some examples of utilization and with reference to the drawing, where:

FIG. 1, in diagram form, shows an embodiment example of the laminate with a film or layer on both sides of a panel of the rigid and brittle material, FIG. 2 shows an elongated body of the rigid and brittle material provided with a film or layer on one surface only, and FIG. 3 shows a special embodiment of the laminate as shown in FIG. 1, provided with seams in a squared pattern to produce an even more flexible and pliable laminate which may be used as backing or cover for various purposes.

The product according to the invention, hereinafter called laminate, consists in one embodiment of an intermediate layer of a preferably cellular material 1, as shown in FIG. 1, which is relatively rigid and brittle with a tendency to surface cracks when subjected to bending stresses causing the material to rupture if the surface is not bonded e.g. by means of an adhesive, and of a flexible, strong material 2, 3 which e.g. may be a textile material, glassfibre cloth, film or the like.

The said outer material layer or film 2 and 3, which is preferably non-stretchable, will thus on bending of the laminate, prevent crack formation in the surface of the intermediate layer, thus providing a laminate which has very good thermal insulation, which does not alter substantially under surface stress and which does not break into pieces when subjected to eventual bending stresses. Depending on the use to which the laminate is to be put, the thickness of the intermediate cellular material 1 may be varied so as to obtain the desired thermal insulation and, possibly, rigidity in the otherwise flexible laminate. The intermediate cellular material or layer 1 may consist, for example, of cellular polystyrene, polyurethane, polyester, polyethylene etc., preferably having small cells since such a material with greatly expanded cells would be so brittle that it would break into pieces notwithstanding the outer layer or film 2, 3 adhered thereto. Any combination of known materials may be used to produce the laminate, provided that the intermediate layer has good thermal insulation and does not permit a too great compression on normal surface stresses such as those to which the laminate will be subject in the various fields of utilization, and that the outer flexible layer or film 2, 3 is of so great a mechanical strength that it does not rupture when the laminate is subjected to sharp bending.

Such a laminate, with an intermediate layer of relatively great thickness, e.g. 2 to 5 cm., may be used for a number of different purposes, for example, in panel form for construction of shelters for emergency housing, or sport, or military use.

The laminate, which in the said form is mechanically strong and, at the same time, very flexible, may in the form of e.g. rectangular elements be bent in an arc and anchored to the ground so that one or more persons can find shelter beneath such an element. Such elements may be constructed to a longer, arc-shaped room, and plane elements may be used as end walls, possibly provided with doors and/or windows. It is also obvious that a laminate in this form may be used as base surface in such shelters.

The laminate may also be used to advantage as insulation mats in any field whatsoever, since it is also greatly resistant to moisture.

In another embodiment of the product, that is to say the laminate according to the invention, the relatively rigid and brittle cellular material 1 is provided, on one side surface only, with a flexible and mechanically strong material layer or film 2, whereby the laminate may be rolled up without rupturing with the layer or film 2 facing outwardly. This is advantageous in connection with the production of the said laminate which may then be rolled for storage purposes or transport of the material.

A further example of the practical utilization of this feature is as follows: A continuous body 4, e.g. a floor board strip may be extruded from a relatively rigid and brittle cellular material 1 as described above, and laminated with a strong, flexible material 2 on one flat side thereof. This allows the strip or profile body 4 to be rolled up for transport so that when using the profile body as a floor board strip it may be laid substatnially in its entire length in contrast to floor board strips produced hitherto of a rigid and brittle material which for practical reasons may be supplied only in limited lengths as it cannot be bent and is therefore easily broken when the lengths are too long.

A laminate such as described in connection wtih FIG. 1 is particularly suitable in the various cases where a relatively thin thermal insulation is desirable, as for instance in car seat covers where the insulating coating is subjected to surface strain and bending stresses due to the soft surface. When so used, the intermediate layer of the laminate is from 3 to 5 mm.; there is of course no reason why a somewhat thinner or a somewhat thicker material should not be used, this being determined in relation to the particular field of utilization. The laminate will be eminently suitable for articles such as sleeping bags and backings for sleeping bags in relation to the various forms of outdoor life, and in particular, sleeping out in winter conditions.

A special embodiment of the laminate is shown on FIG. 3 where, in order to render the laminate more flexible and pliable, seams 5 are arranged to form a squared pattern, for example, the said seams forming natural bending lines in the laminate while, at the same time, each square 6 may be bent to a substantial degree.

It has been stated hereinbefore that the laminate according to FIG. 1 may also be used advantageously as insulation mats in any field whatsoever, and one of these fields is road building. In recent years it has been found advantageous to introduce a moisture resistant and insulating layer into the actual road bed, and the laminate according to the invention, which consists of a relatively thin intermediate layer 1 having a moisture resistant outer film or layer 2, 3 is eminently suitable to this purpose since it may be bent very sharply in all directions, for example, it may be disposed upon an uneven surface of stones and may be loaded from above with stones and sand without the intermediate layer 1 rupturing.

The product or laminate according to the invention is thus suitable for use in all fields where it is to be, or may be, subjected to substantially sharp bending.

Further examples of the use of the laminate according to the invention are as follows:

The laminate in strip form with one-sided or two-sided coating may be used for insulative winding of pipes. In this form it may be wound into tubes, cylinder formed packaging and channels. The windings may be adhered by suitable means such as providing the edge of the strips with cooperating tongue and groove or allowing one or both coatings to extend beyond the side edge or edges, and to be used for adhesion of the windings.

As will be clear from the preceding examples, the laminate according to the invention may be used in a large number of different fields, and the examples given cannot be regarded as a restriction of the scope of the invention.

What is claimed is:

1. The method of rendering flexible and preventing the cracking and breaking of a rigid, brittle plate-shaped body of cellular plastic material when subjected to winding or bending to provide arc-shaped structures such as tubes, hollow and bent articles, comprising providing a rigd, brittle plate-shaped body of cellular plastic thermal insulating material having two opposite side surfaces and a thickness of 2 to 5 cm., bonding the surface of said body which is to be the outer portion of said arc-shaped structure to one surface of a flexible, nonstretchable layer of a covering material, bending the resulting laminate into an arc-shaped structure and subjecting the rigid, brittle plastic body thereof to tensioning forces with said layer of covering material on its outer surface where it prevents fracture and rupture of the crack formation in the outer portion of said body of rigid, brittle material when subjected to said bending of the laminated structure to provide said arc-shaped structure.

References Cited

UNITED STATES PATENTS

| | | | |
|---|---|---|---|
| 3,533,900 | 10/1970 | Abell | 161—159 |
| 3,433,700 | 3/1969 | Migdol et al. | 156—77 X |
| 3,061,475 | 10/1962 | Wallace | 156—78 X |
| 3,531,367 | 9/1970 | Karsten | 161—160 |
| 3,425,889 | 2/1969 | Willits | 161—159 X |
| 3,381,420 | 5/1968 | Brink et al. | 52—2 |
| 3,256,131 | 6/1966 | Koch et al. | 156—79 X |

CARL D. QUARFORTH, Primary Examiner

R. L. TATE, Assistant Examiner

U.S. Cl. X.R.

156—77